(12) United States Patent
Miller et al.

(10) Patent No.: US 8,145,805 B2
(45) Date of Patent: Mar. 27, 2012

(54) METHOD FOR RE-SEQUENCING COMMANDS AND DATA BETWEEN A MASTER AND TARGET DEVICES UTILIZING PARALLEL PROCESSING

(75) Inventors: Eddie Miller, Costa Mesa, CA (US); David James Duckman, Costa Mesa, CA (US); Nazmul H. Khan, Costa Mesa, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 307 days.

(21) Appl. No.: 12/135,890

(22) Filed: Jun. 9, 2008

(65) Prior Publication Data

US 2009/0307473 A1   Dec. 10, 2009

(51) Int. Cl.
*G06F 13/00* (2006.01)
(52) U.S. Cl. .......................................... 710/39
(58) Field of Classification Search ................... None
See application file for complete search history.

(56) References Cited

U.S. PATENT DOCUMENTS

| | | | | |
|---|---|---|---|---|
| 5,133,077 A * | 7/1992 | Karne et al. | .............. | 712/23 |
| 5,504,900 A * | 4/1996 | Raz | .............. | 1/1 |
| 5,615,343 A * | 3/1997 | Sarangdhar et al. | .......... | 710/112 |
| 5,630,096 A * | 5/1997 | Zuravleff et al. | ............. | 711/154 |
| 5,805,842 A * | 9/1998 | Nagaraj et al. | ................ | 710/313 |
| 5,835,739 A * | 11/1998 | Bell et al. | ........................ | 710/309 |
| 5,878,235 A * | 3/1999 | Porterfield et al. | ............ | 710/112 |
| 5,978,872 A * | 11/1999 | Porterfield et al. | ............ | 710/100 |
| 5,991,843 A * | 11/1999 | Porterfield et al. | ............ | 710/112 |
| 6,079,012 A * | 6/2000 | Morris et al. | ................ | 712/216 |
| 6,260,091 B1 * | 7/2001 | Jayakumar et al. | ............ | 710/113 |
| 6,356,972 B1 * | 3/2002 | Chin et al. | ..................... | 710/310 |
| 6,385,705 B1 * | 5/2002 | Keller et al. | ................... | 711/154 |
| 6,421,723 B1 * | 7/2002 | Tawil | ............................ | 709/224 |
| 6,591,325 B1 * | 7/2003 | Akashi et al. | ................. | 710/305 |
| 6,728,816 B1 * | 4/2004 | Worrell | ......................... | 710/305 |
| 6,757,768 B1 * | 6/2004 | Potter et al. | .................. | 710/112 |
| 6,807,593 B1 * | 10/2004 | Moss et al. | .................... | 710/110 |
| 6,886,048 B2 * | 4/2005 | Richard et al. | .................... | 710/5 |
| 2002/0163354 A1 * | 11/2002 | Bingert et al. | ................... | 326/10 |
| 2003/0037225 A1 * | 2/2003 | Deng et al. | ..................... | 712/227 |
| 2003/0208670 A1 * | 11/2003 | Dawkins et al. | ................. | 712/13 |
| 2004/0068603 A1 * | 4/2004 | Augsburg et al. | ............. | 710/310 |
| 2005/0149603 A1 * | 7/2005 | DeSota et al. | ................. | 709/200 |
| 2005/0289326 A1 * | 12/2005 | Lea | ............................... | 712/218 |

(Continued)

OTHER PUBLICATIONS

Smith et al. (Implementation of Precise Interrupts in Pipelined Processors); 25 years of the international symposia on Computer architecture (selected papers); pp. 291-299; Year of Publication: 1998.*

(Continued)

*Primary Examiner* — Keith Vicary
(74) *Attorney, Agent, or Firm* — Morrison & Foerster LLP

(57) ABSTRACT

Re-sequencing commands and data between a master and slave device utilizing parallel processing is disclosed. When utilizing parallel processing while reading and writing data, there is a chance that the data will be read or written in an improper order, given the time delays associated with different slave devices and the processing time associated with various commands. Therefore, to retain the speed and improved performance of parallel processing while maintaining data coherency, the instructions and data are re-sequenced and processed in the proper order, and the returned data are re-sequenced and returned to the processor in the proper order.

28 Claims, 5 Drawing Sheets

(Read Operation)

U.S. PATENT DOCUMENTS

2008/0034146 A1* 2/2008 Duncan et al. ............... 710/309
2008/0320476 A1* 12/2008 Wingard et al. ............. 718/101
2009/0043940 A1* 2/2009 Myers .......................... 710/310

OTHER PUBLICATIONS

Katz (Lecture 10: Case Study-CDC 6600 Scoreboard); Computer Science 252—Graduate Computer Architecture—University of California, Berkeley, Spring 1996; 37 pages.*

Folegnani et al. (Energy-Effective Issue Logic); 28th Annual International Symposium on Computer Architecture (ISCA'01), 2001, pp. 230-239.*

Xie et al. (A Code Decompression Architecture for VLIW Processors); Proceedings of the 34th annual ACM/IEEE international symposium on Microarchitecture; pp. 66-75; Year of Publication: 2001.*

* cited by examiner (Read Operation)

(Write Operation)

METHOD FOR RE-SEQUENCING COMMANDS AND DATA BETWEEN A MASTER AND TARGET DEVICES UTILIZING PARALLEL PROCESSING

FIELD OF THE INVENTION

This invention relates to sequential processing from a parallel processing architecture. More specifically, embodiments of this invention relate to increasing the performance of a memory interface for a processor that allows multiple memory transactions simultaneously, while maintaining coherency.

BACKGROUND OF THE INVENTION

A computing system generally includes a processor coupled to internal memory, including flash or Random Access Memory (RAM), and external memory devices and peripheral devices. A bus generally provides an interface between the processor and the external memory, the on-chip memory, and other peripheral devices. A bridge may be used to couple a high-performance bus with a memory bus, enabling high-bandwidth devices such as the processor to communicate with internal memory, external memory, or other peripheral devices in the system. The bus on both sides of the bridge may use various protocols to govern the transfer of instructions and responses. The bridge generally converts the protocols utilized by the processor (the front end) to the protocols utilized by the memory devices and peripheral devices (the back end).

Bus transfers may include read or write operations for data objects, which may take one or more clock cycles. Some processor architectures are sequential, which requires each instruction to complete, including the return or writing of any data, before the next instruction can be issued and executed. An example of a sequential bus is the Advanced High-Performance Bus (AHB). Under the AHB protocol, a master device may be granted access to the bus. Only one master can access the bus at any given time. The master can send a read or write request over the bus to attached slave devices. Each instruction and response should be completed before another instruction is initiated or before another master can access the bus. The AMBA Specification (document number IHI 0011A), which is incorporated in its entirety by reference herein, fully describes the AHB protocol and can be found at the ARM website, www.arm.com.

Modern bus connections between the elements of the system are no longer limited to sequential processing, but can now process commands in parallel. Therefore, multiple read and write requests may be sent to the various memory elements at the same time. An example of a parallel bus is the ARM Advanced eXtensible Interface (AXI), which takes advantage of separate channels for read and write transactions, and supports parallel processing of various read and write requests. The AMBA AXI Protocol Specification (document number IHI 0022B) can be found at the ARM website, www.arm.com, and is incorporated in its entirety herein by reference. When taking advantage of a parallel bus, maintaining data coherency may become difficult. As each instruction and response time may take varying clock cycles to complete, and each instruction may be carried out independently, the instructions may complete out of sequence if a controller is not responsible for resequencing the commands and returned data.

SUMMARY OF THE INVENTION

Embodiments of the invention relate to re-sequencing commands and data between a master and slave device utilizing parallel processing. When utilizing parallel processing while reading and writing data, there is a chance that the data will be read or written in an improper order, given the time delays associated with different slave devices and the processing time associated with various commands. Therefore, to retain the speed and improved performance of parallel processing while maintaining data coherency, the instructions and data are re-sequenced and processed in the proper order, and the returned data are re-sequenced and returned to the processor in the proper order.

Read and write requests from a CPU can be first stored in an address and control queue. For read requests, the CPU can send read requests across a read channel parallel bus on consecutive clock cycles, or as they are available. Bridge control logic receives these requests and stores them in a First In First Out (FIFO) address and control queue. When the bridge control logic determines that the associated target memory address is not currently used, the bridge control logic will pop the address and control information from the address and control queue. The bridge control logic generates a select signal to the associated target memory controller, alerting the memory controller to prepare for a read request. The memory read state machine then performs the appropriate interactions with the desired target memory address to retrieve the desired data.

Once the first instruction is popped from the address and control queue, the bridge control logic determines whether the next instruction should be executed by looking at the address associated with the next instruction. If the next instruction is not associated with a used memory location, the bridge control logic will pop the instruction. The bridge control logic may send a select signal to the associated state machine for the desired slave device and continue to read the desired data.

The bridge control logic stores the address for read requests in another queue (read order queue) to re-sequence the data returned from the various slave devices. When the read requests are completed by the various slave devices, the read order queue is used to send the next read data to the CPU in the proper order. Once the appropriate data line is selected and the associated data is sent back to the CPU, the address is removed from the read order queue.

Depending on the protocol used, a write request may include the memory address to be written, the amount of data written, and the data to be written. The CPU sends the write request to the bridge. Write logic may be configured to write the appropriate data to the desired memory location.

When the bridge control logic determines that the target memory location of the next instruction is currently not in use, the bridge control logic will pop the instruction from the address and control queue. The bridge control logic may then send a memory select signal to the write memory state machine associated with the target memory location. If the memory location is not currently busy, the request is popped from the address and control queue. To prevent unnecessarily delaying further instructions not associated with the target memory, the instruction is popped from the address and control queue so that the bridge control logic may continue with the next instruction. The write memory state machine may be delayed by the retrieval of the associated data from the data bus. Therefore, in one embodiment the address and data lengths are stored in the secondary write address queue. The write address includes the address of the target memory along with the length of the associated data to be written. The write memory state machine then reads the write data queue for the associated amount of data for the first request. A memory turn signal may be used by the write memory state machine to indicate how much of the current write data queue should be written to the target memory location. The write memory state machine then writes the data to the target memory location. Once the request is executed, the memory busy signal is deselected to alert the bridge control logic that the memory location is no longer used.

Once the first instruction is popped from the address and control queue, the bridge control logic then looks to the next instruction. If the associated memory location is currently in use by a previous instruction, the bridge control logic will stall until the associate memory state machine is available. In an alternate embodiment, the bridge control logic may compare the current address with the write address queue to determine if an address is in use. Since all of the pending write address requests may be stored in the write address queue, the bridge control logic may compare the current address from the address and control queue with the write address queue to determine if the target memory location is in use.

DETAILED DESCRIPTION OF THE PREFERRED EMBODIMENTS

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

Embodiments of the invention relate to resequencing commands and data between a master and slave device utilizing parallel processing. When utilizing parallel processing while reading and writing data, there is a chance that the data will be read or written in an improper order, given the time delays associated with different slave devices and the processing time associated with various commands. Therefore, to retain the speed and improved performance of parallel processing while maintaining data coherency, the instructions and data can be re-sequenced according to some aspects of the present invention. The instructions can then be processed in the proper order, and the returned data can be re-sequenced and returned to the processor in the proper order. There may be occasions when sequential processing is still desired. Therefore, according to some aspects of the invention, the instructions may still be processed sequentially.

Although embodiments of the invention may be described and illustrated herein in terms of a processor interacting with memory, it should be understood that embodiments of this invention are not so limited, but are additionally applicable to other master/slave relationships where information is passed between these devices. Furthermore, although embodiments of the invention may be described and illustrated herein in terms of reading and writing to memory, it should be understood that embodiments of the invention are also applicable to other internal or external devices, such as Static Random Access Memory (SRAM), local memory, external memory, flash memory, registers, or interfaces to other devices, such as, for example, a Universal Asynchronous Receiver/Transmitter (UART) interfacing with peripheral devices. Embodiments of the invention may improve overall processing speed and data coherency in any computing system utilizing a parallel command architecture, including blade servers, storage area networks, and more generally fibre channel products with a processor utilizing an AXI interface.

Figure 1:
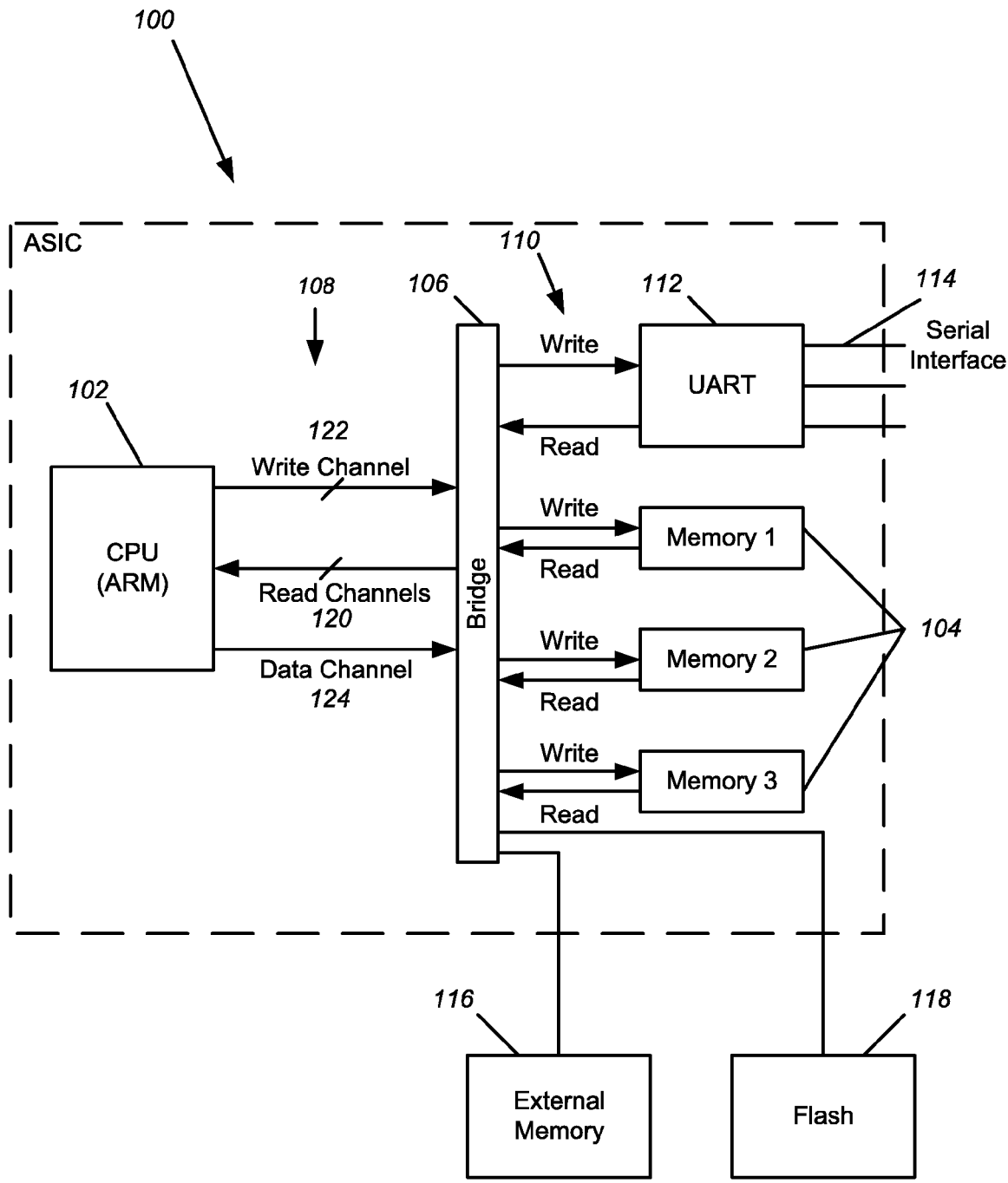
FIG. 1 illustrates an exemplary Application Specific Integrated Chip (ASIC) according to embodiments of the invention.

FIG. 1 illustrates an exemplary Application Specific Integrated Circuit (ASIC) 100 according to embodiments of the invention. The ASIC 100 includes a central processing unit (CPU) coupled to memory 104 through a bridge circuit 106. The ASIC may reside in a circuit board as part of an adapter card such as a Host Bus Adapter (HBA) utilized within Storage Area Networks (SANs). The CPU 102 may be any processing unit, but for example may be an Advanced Reduced Instruction Set Computer (RISC) Machine (ARM) processor. The memory 104 may be any on-chip memory, including flash, Random Access Memory (RAM), registers, or other local memory. The bridge circuit 106 contains logic configured to convert the protocols used for the front end interface 108, between the CPU and the bridge, to the protocols used by the back end interface 110, between the bridge and other elements. The bridge 106 may additionally be coupled to an interface for peripheral devices 112. For example, a Universal Asynchronous Receiver/Transmitter (UART) may be used as an interface to translate data between the parallel protocols of the back end of the bridge and the serial interfaces of coupled devices 114, such as a keyboard (not shown). The bridge may additionally couple to external memory 116, such as flash memory 118.

The front end 108 of the bridge 106 coupled to the CPU 102 may be a parallel bus connection. The front end 108 may be operated under any parallel processing protocol, such as, for example, AXI. Under the AXI protocol, the bus coupling the CPU 102 to the bridge 106 may contain a separate parallel channel 120 for read commands and a parallel channel 122 for write commands. The front end interface 108 may also include a separate data channel 124 for sending data associated with write commands. The back end 110 couples the memory 104 and other elements to the bridge 106 through a separate bus. The bus may operate on a different protocol, such as, for example, the Advanced Peripheral Bus (APB) protocol. Each back end device may be governed by a different protocol. The bridge 106, therefore, may convert between the protocols of the front end 108 and the back end 110 to ensure the various elements can properly communicate.

Because the bus 108 between the CPU 102 and the bridge 106 may be a parallel connection, multiple instructions from the processor may be carried out simultaneously. Instructions from the CPU 102 are sent to the bridge 106 on subsequent clock cycles and may be executed simultaneously and independently. Therefore, instructions sent from the CPU 102 may complete at various time, out of order, depending on the time needed to complete each instruction. Conventionally, instructions may be written assuming that each instruction will be executed in a sequential order. If the instructions are dependent on each other, and assume a certain order of completion, then parallel execution may cause coherency problems. According to embodiments of the present invention, the bridge may include sequencing logic, queues, registers, state machines, and a controller to handle the sequencing of instructions and data utilizing the parallel architecture. Also, given legacy firmware code, the system may need the flexibility to continue to sequentially process instructions.

Figure 2A:
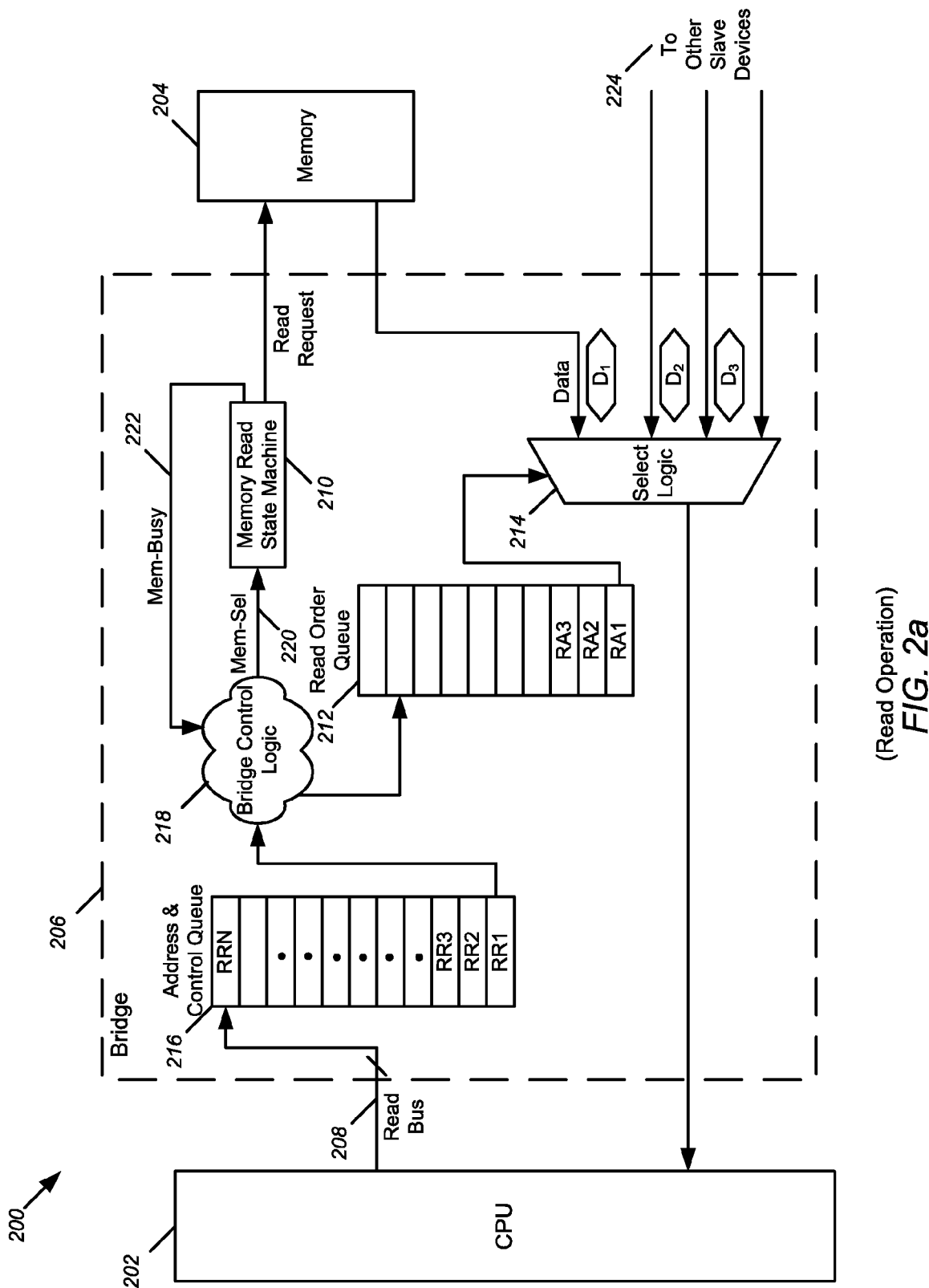
FIG. 2A illustrates an exemplary computing system according to embodiments of the invention for controlling coherency when reading data.

FIG. 2A illustrates an exemplary computing system 200 according to embodiments of the invention for controlling coherency when reading data. When the CPU 202 requests a read from memory 204, the instruction may be sent over the bus 208 to the bridge 206. Read logic (memory read state machine) 210 may be configured to request and read the data from the desired memory location 204. In a parallel architecture, the read requests may be sent from the CPU 202 to the memory read state machine 210 consecutively, but may be executed concurrently. Therefore, the first request may not terminate, i.e. retrieve the data, before the next instruction is sent. The various memory devices may then return the data whenever the information is retrieved. If the data is not re-sequenced, the CPU may get the data in the incorrect order. In order to maintain proper sequencing, the addresses from the read requests from the CPU 202 may be stored in a read order queue 212. When the data is retrieved from the various memory devices 204, the read order queue 212 may be used to select the appropriate data line using select logic 214 to re-sequence the data to the CPU 202.

According to one embodiment of the invention, read and write requests from the CPU 202 are first stored in an address and control queue 216. The CPU 202 sends read requests across the read channel parallel bus 208 on consecutive clock cycles, or as they are available. The bridge 206 state machine receives these requests and stores them in a First In First Out (FIFO) address and control queue 216. For example, read request RR1, RR2, and RR3 are sent from the CPU consecutively and stored in the address and control queue. The bridge control logic 218 then looks at the first instruction in the address and control queue 216. The bridge control logic 218 may be a state machine configured for controlling the order and timing of instructions from the CPU 202. The bridge control logic 218 may determine whether the target address is busy. In the example of FIG. 2A, read request RR1, associated with target memory 204, is the first instruction, and therefore the associated target memory address is not currently used. Therefore, the bridge control logic 218 will pop the address and control information from the address and control queue 216. The bridge control logic 218 generates a select signal, mem_sel 220, to the associated target memory controller (memory read state machine) 210. The select signal alerts the memory controller to prepare for a read request. The memory read state machine 210, in response to the select signal, returns a busy signal, mem_busy 222 to the bridge control logic 218. Therefore, the next time the bridge controller 218 attempts to compare a new instruction with the associated target address, the bridge controller will wait until the memory is available before popping the next instruction from the address and control queue. The memory read state machine 210 then performs the appropriate interactions with the desired target memory address 204 to retrieve the desired data.

Once the first instruction is popped from the address and control queue 216, the bridge control logic 218 determines whether the next instruction should be executed. The bridge control logic 218 looks at the address associated with the next instruction, RR2. If the address associated with RR2 is for memory block 204, the bridge control logic 218 will wait until the instruction using the memory read state machine 210 associated with the target address 204 is completed. If the next instruction, RR2, is not associated with the used memory location 204, but to some other device such as unused slave device 224, the bridge controller 218 will pop the instruction RR2. The bridge control logic 218 may send a select signal to the associated state machine for the desired slave device and continue to read the desired data.

The bridge control logic 218 stores the address for read requests in another queue (read order queue) 212 to re-sequence the data returned from the various slave devices. When the read requests are completed by the various slave devices, the data may be returned in any random order, according to the time delays associated with the various devices. Therefore, selection logic 214 uses the read order queue 212 to select the appropriate data line and send the next read data to the CPU 202 in the proper order. In the example of FIG. 2A, data D1 is associated with the first read request RR1 and data D2 with the second read request RR2. If the slave device associated with RR2 returns the data faster that the associated memory 204 with RR1, the CPU 202 would receive the data out of sequence if the data was sent directly to the processor. The read order queue 212 keeps track of the desired sequencing of the returned data. Therefore, when data is returned from the various devices, the read order queue 212 is used to select the proper data line using select logic 214. Once the appropriate data line is selected and the associated data is sent back to the CPU 202, the address is removed from the read order queue 212. Once the data is returned to the CPU 202, the memory busy signal, mem_busy, 222 is deactivated to alert the bridge control logic 218 that the associated memory 204 is available for the next instruction.

In an alternate embodiment, the bridge control logic 218 may use the read order queue 212 to determine if a specific address is already in use. As each read instruction is executed, the associated addresses for all pending instructions are stored in the read order queue 212, and once the data is returned to the CPU 202, the address is removed from the read order queue. The read order queue 212 is a list of all addresses currently being used for a read request. Therefore, instead of the bridge control logic 218 sending a memory select signal 220 and receiving a memory busy signal 222, the bridge control logic may use the read order queue to determine whether a specific address is currently in use.

Figure 2B:
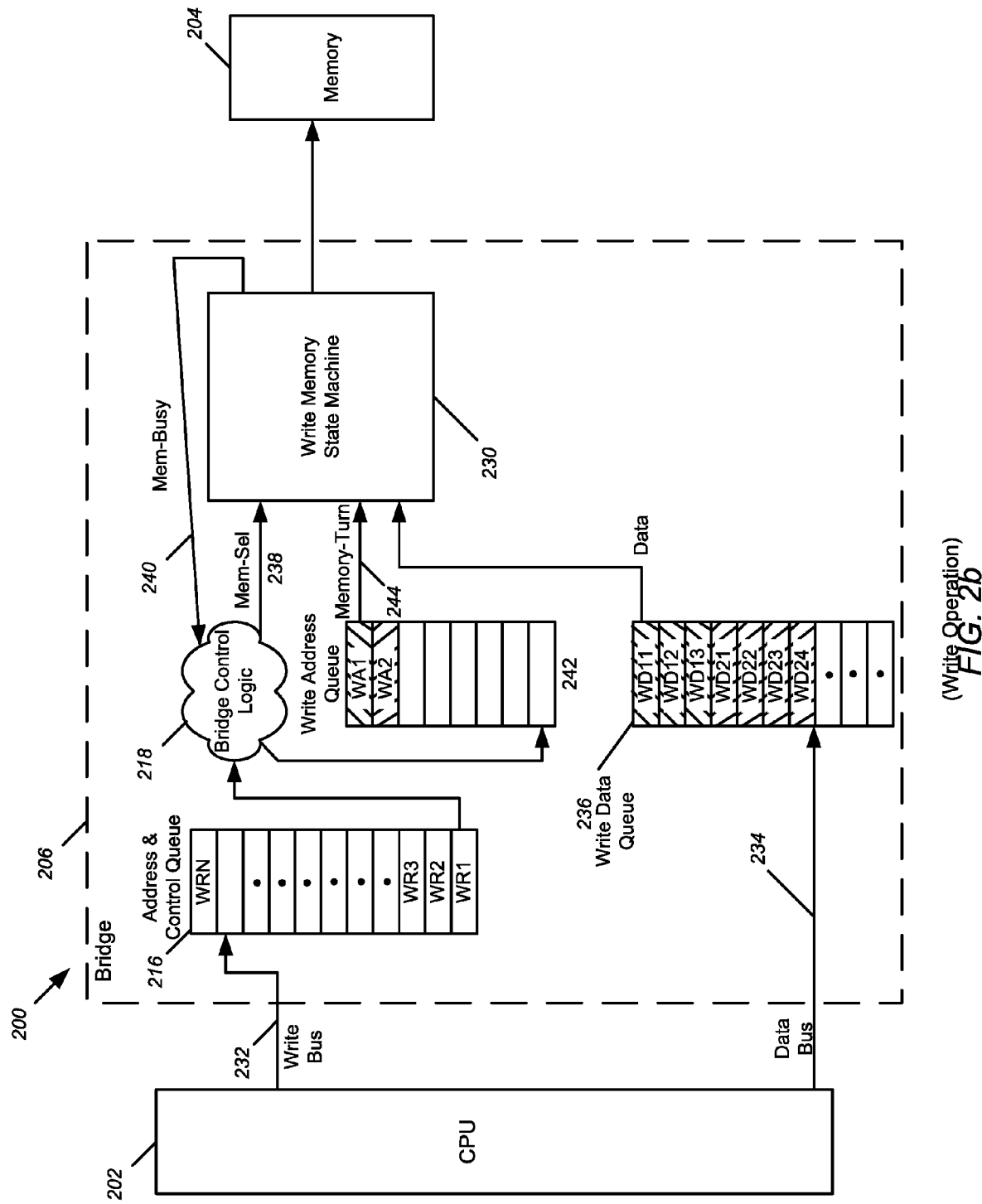
FIG. 2B illustrates an exemplary computing system according to embodiments of the invention for controlling coherency when writing data.

FIG. 2B illustrates an exemplary computing system 200 according to embodiments of the invention for controlling coherency when writing data. Depending on the protocol used, a write request may include the memory address to be written, the amount of data written, and the data to be written. The CPU 202 sends the write request to the bridge 206. Write logic (write state machine) 230 may be configured to write the appropriate data to the desired memory location 204.

According to one embodiment of the invention, a bridge controller (bridge control logic) 218 uses queues to re-sequence write instructions. For example, a series of write requests, WR1, WR2, and WR3 are sent from the CPU 202 over the parallel write bus 232. The instructions are stored in a FIFO address and control queue 216. The associated data to be written to the target slave device may be sent over a data bus 234 and is stored in a write data queue 236. The bridge control logic 218 may determine whether the target memory location of the next instruction is currently busy. In the example of FIG. 2B, as write request WR1 is the first request, the associated memory location is not in use. Therefore, the bridge control logic 218 will pop the instruction WR1 from the address and control queue 216. The bridge control logic 218 may then send a memory select signal, mem_sel 238, to the write memory state machine 230 associated with the target memory location 204. In response to the select signal 238, the write memory state machine 230 may send a memory busy signal, mem_busy 240, to the bridge control logic 218. Therefore, when the bridge control logic 218 encounters the next instruction WR2, the bridge controller will be able to determine that memory 204 is currently in use.

If the memory location is not currently busy, the request WR1 is popped from the address and control queue 216. In one embodiment, the bridge control logic may then copy the address information with the size of the associated data for the write request to a write address queue 242. The time associated to receive the address and control requests from the CPU 202 may be different as compared to the time to receive the associated data information from the CPU. Therefore, to prevent unnecessarily delaying further instructions not associated with the target memory, the instruction is popped from the address and control queue 216 so that the bridge control logic 218 may continue with the next instruction. The write memory state machine 230 may be delayed by the retrieval of the associated data from the data bus 234. Therefore, in one embodiment the address and data lengths are stored in the secondary write address queue 242. The write address WA1 includes the address of the target memory 204 along with the length of the associated data to be written. The write memory state machine 230 then reads the write data queue 236 for the associated amount of data, WD11, WD12, WD13, for the first request WA1. A memory turn signal mem_turn 244 signal may be used by the write memory state machine 230 to indicate how much of the current write data queue 236 should be written to the target memory location 204. The write memory state machine 230 the writes the data to the target memory location 204. Once the request is executed, the memory busy signal 240 is deselected to alert the bridge control logic 218 that the memory location is no longer used. The current address in the write address queue 242 is not removed until the associated data is retrieved from the write data queue 236. The memory turn signal 244 is also deactivated to alert the write memory state machine 230 that it has retrieved all of the associated data.

Once the first instruction is popped from the address and control queue 216, the bridge control logic 218 then looks to the next instruction, WR2. If the associated memory location is currently in use by a previous instruction, the bridge control logic 218 will stall until the associate memory state machine is available. In an alternate embodiment, the bridge control logic 218 may compare the current address with the write address queue 242 to determine if an address is in use. Since all of the pending write address requests may be stored in the write address queue 242, the bridge control logic 218 may compare the current address from the address and control queue 216 with the write address queue to determine if the target memory location is in use.

An exemplary computing system according to embodiments of the invention for controlling coherency for reading and writing events may incorporate aspects of the read and write descriptions from above. The CPU 202 sends an instruction, which may include address, control, and data information. The address indicates the target location; the control tells how much data is involved. When the CPU 202 sends a read or write request to memory 204, the bridge 206 uses the address and control queue 216 to ensure data coherency. The instructions sent from the CPU 202, regardless of read or write requests, are stored in the address and control queue 216; data received from the CPU 202 for write requests is stored in write data queue 236.

The bridge controller 218 then pops an instruction from the address and control queue 216 if the associated target address is not busy. If the instruction is a write request, the bridge controller 218 sends the request to the write logic 230, which includes a state machine or gates configured to write the data to the desired memory location. The write address information is sent to the write address queue 242. The bridge controller 218 or the write logic 230 reads the information from the write request, and according to the indicated data length to be written, pops the data associated with the write request from the data queue 236. The data may then be written to the desired memory location 204.

If the instruction is a read request, then referring again to FIG. 2A, the bridge controller 218 may send the information to the read logic 210, which is a state machine or gates configured to read data from a desired memory location. The bridge controller 218 or read logic 210 also stores the read request addresses in a read order queue 212 to assist with re-sequencing the data when it is read from the memory locations. When data from a read request is returned to the bridge 206, selection logic 214, using the read order queue 212, select the appropriate channel to send the data retrieved to the CPU 202 in the appropriate order.

In one embodiment of the invention, before an address may be popped from the address and control queue 216, the bridge controller 218 may first check to ensure that the target address is not busy. Each connection to the various memory elements 224 may include a busy signal, which indicated to the bridge controller 218 that a previous request to the desired memory address is already in use. Therefore, the instruction may not be popped from the address and control queue 216, until that transaction is completed. As long as a memory location is currently manipulated, the busy signal may indicate to the bridge controller 218 to postpone accessing the desired location. The instruction may be popped and executed after the previous instruction is completed, and the select signal for that memory address is turned off.

In an alternate embodiment of the invention, another register may be used to indicate which address locations are currently being utilized. Therefore, when each instruction, read or write, is issued by the bridge controller 218, the associated address may be stored in a used address register. Before an instruction may be popped from the address and control queue 216, the bridge controller 218 compares the address with the used address register to ensure that an address is not currently in use. If the address is currently being used, then the instruction may wait until the current operation is completed. However, if the address is open, then the instruction may be popped and sent to the appropriate read or write logic. When an instruction is complete, the data may be either written or retrieved to or from the memory location, and the address may be erased from the used address register. Since the addresses associated with a read request may already be stored in the read order queue 212 or the write address queue 242, these queues may be used to determine which address are currently in use. The bridge controller 218 may then compare the current instruction address against these locations to determine whether an address is in use.

In one embodiment of the invention, the address and control queue 216 can be programmed to a certain depth. The queue depth may be set through a register or other device to indicate how many instructions the queue can hold from the processor at a given time. Generally, the register for the address and control queue depth is set before the CPU sends any instructions and before the queue is used. If the queue depth is set to any non-zero integer, then the bridge may propagate the instructions in a parallel architecture. However, if sequential processing is desired, the queue depth may be set to zero to force each instruction to be completed before the next instruction may be received from the CPU. If the queue is set to a zero depth, then the bridge controller may not have a subsequent instruction to consider before the previous instruction is fully performed. However, if the address queue is set to a greater depth, the instructions may be run in parallel.

A register may be used to control the depth of the queue. The queue depth register can be changed at any time by firmware by programming a new value. Generally, changing the depth of the queue during program operation is not performed since information can be lost. If the queue depth is set to a certain value, and the queue is filled to capacity with pending instructions, and then a change occurs to reduce the available elements within the queue, those last instructions over the new queue depth may be lost. So, for example, if the hardware thinks the queue depth is a certain value, such as 4, and then the firmware changes it to 1, then if the hardware has already accepted address and control in its queues at the time firmware changes the queue depth, the addresses and control could be lost if not handled properly. The hardware, therefore, may detect the firmware has changed the values of the queue depth, and then the firmware can stop all future writes to the queue and hold off the effect of the queue depth change until the current address and control information is drained out of the queue in its normal manner. When an "empty" is detected by the hardware, it allows the effect of the queue depth change to occur and re-enables writing into the queue. Operation may resume as normal. Alternatively, the used entries of the queue may be tracked. Once the queue has drained below the new depth amount, the queue depth change may occur, and the queue may continue taking information from the CPU. Therefore, the queue depth may be changed on the fly, permitting sequential or parallel processing to occur as desired by simply changing the queue depth.

Figure 3:
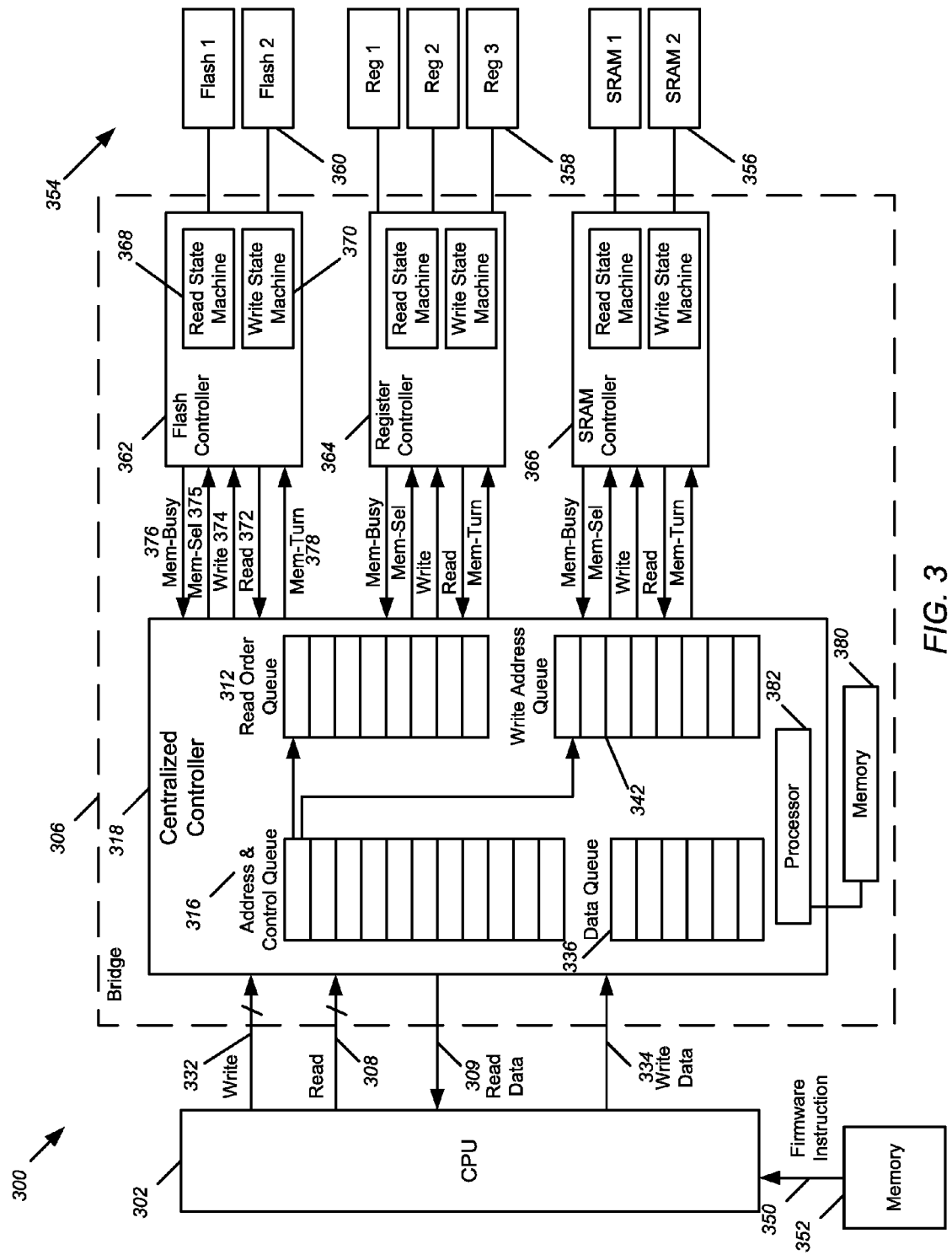
FIG. 3 illustrates an exemplary computing system that can include one or more embodiments of the invention described, including re-sequencing commands and data for data coherency according to embodiments of the invention.

FIG. 3 illustrates exemplary computing system 300 that can include one or more embodiments of the invention described above. Computing system 300 may be used in any computing system that may use parallel processing to communicate between master and slave devices. The CPU 302 executes firmware 350 from memory 352. The firmware 350 contains written instructions stored in memory 352. The CPU 302 may convert the firmware instruction to a processor interface protocol, including address, control, and data commands, which may then be sent to a slave device 354. The CPU 302 may send write commands to a slave device 354 through a parallel write channel 332, and the associated write data over a data bus 334. The CPU 302 may alternatively send read commands to a slave device 354 by a parallel read channel 308, with read data being returned through read data bus 309. Instructions from the CPU 302 to a slave device 354 may be issued through bridge 306, which interfaces the protocols of the front end interactions with the CPU 302 and the back end interactions with the slave devices 354. The slave devices 354 may be any internal or external device that interacts with the CPU 302. For example, a slave device may be memory, such as Static Random Access Memory (SRAM) 356, local memory, or flash memory 360; the slave device may alternatively be a register 358 or interfaces to other devices, such as a Universal Asynchronous Receiver/Transmitter (UART) to attached serial devices.

CPU commands may be sent from the CPU 302 in parallel to the centralized controller 318 within bridge 306. Incoming instructions may be stored in an address and control queue 316, as long as the queue is not full. The address and control queue 316 may be divided up into one or more queues or registers. For example, the data associated with write requests may be stored in a separate data queue 336. As the centralized controller 316 pops each instruction in a first in, first out order, the centralized controller 316 may determine whether the address of the current instruction is currently in use by a previous, uncompleted instruction. The centralized controller 318 pops an instruction once the associated memory location is not in use. This prevents manipulating the same address location by different commands simultaneously, and potentially out of order. The centralized controller 318 may then take advantage of an additional queue, such as a read order queue 312 and write address queue 342, to ensure data coherency as the instructions are executed.

In one embodiment, each slave device 354 may have one or more individual controllers to assist with each set of attached devices. For example, flash memory 360 may have an associated flash controller 362; registers 358 may have an associated register controller 364; and SRAM 356 an associated controller 366. Each controller may include a read state machine 368 and a write state machine 370 to accomplish the read and write commands to its associated slave device. A read channel 372 and write channel 374 may also couple the centralized controller 318 with the respective slave controller 362 to receive and return the various commands from the centralized controller 318.

In various embodiments of the present invention, each slave controller 362, 364, and 366 may include signal lines coupled to the centralized controller 318. A select signal, mem_sel, 375 may be used to alert a slave controller 362 that it is about to be used. When the centralized controller 318 pops the next command from the address and control queue 316, the centralized controller may send a memory select 375 signal to the associated target memory controller to indicate a command is coming. In response to this signal, the associated slave controller 362 may return a memory busy, mem_busy, 376 signal to the centralized controller 318 to alert the controller that the associated slave controller is in use. The centralized controller 318 may hold subsequent instructions in the address and control queue 316 if the next command requests a memory controller currently in use, indicated by the memory busy signal. Once read data is returned from the slave device, or a write request is completed, the memory busy 376 signal is turned "off," indicating that the associated controller 362 is available for the next instruction. A memory turn signal, mem_turn 378, may also be used to indicate which controller, flash 362, register 364, or SRAM 366, has present control of a certain bus. For example, since the write commands may be sent in a single clock cycle, but receiving the associated data may occur over multiple clock cycles, the slave controller must know which device has control of the data bus at a given time to receive data associated with its own address write request.

In some embodiments of the present invention, additional instructions to the bridge controller 318 may be stored in the address information within the instruction request from the CPU 302. In some instances, a programmer may desire to run an instruction in a sequential processing manner, and not have an instruction run in parallel with other instructions. Therefore, in one embodiment, a bit not needed for an address location may be dedicated to signal the bridge controller 318 to hold a current instruction until all previous instructions have completed. By using a bit within the address, the bridge controller can check this address bit to determine whether it is selected or not. If this bit is selected, then the bridge controller may not pop the instruction until all of the previous instructions have completed, and thereby simulate sequential processing for this particular instruction. For example, an address may be sent in a 32 bit string. However, the last 3 bits may be unused to actually indicate an address location. Therefore, one of these unused bits, for example, bit 30, may be used to indicate to the bridge controller not to pop the instruction until all previous instructions are completed. When this bit is selected, the bridge controller 318 may not pop the next instruction until the current instruction is completed.

Figure 4:
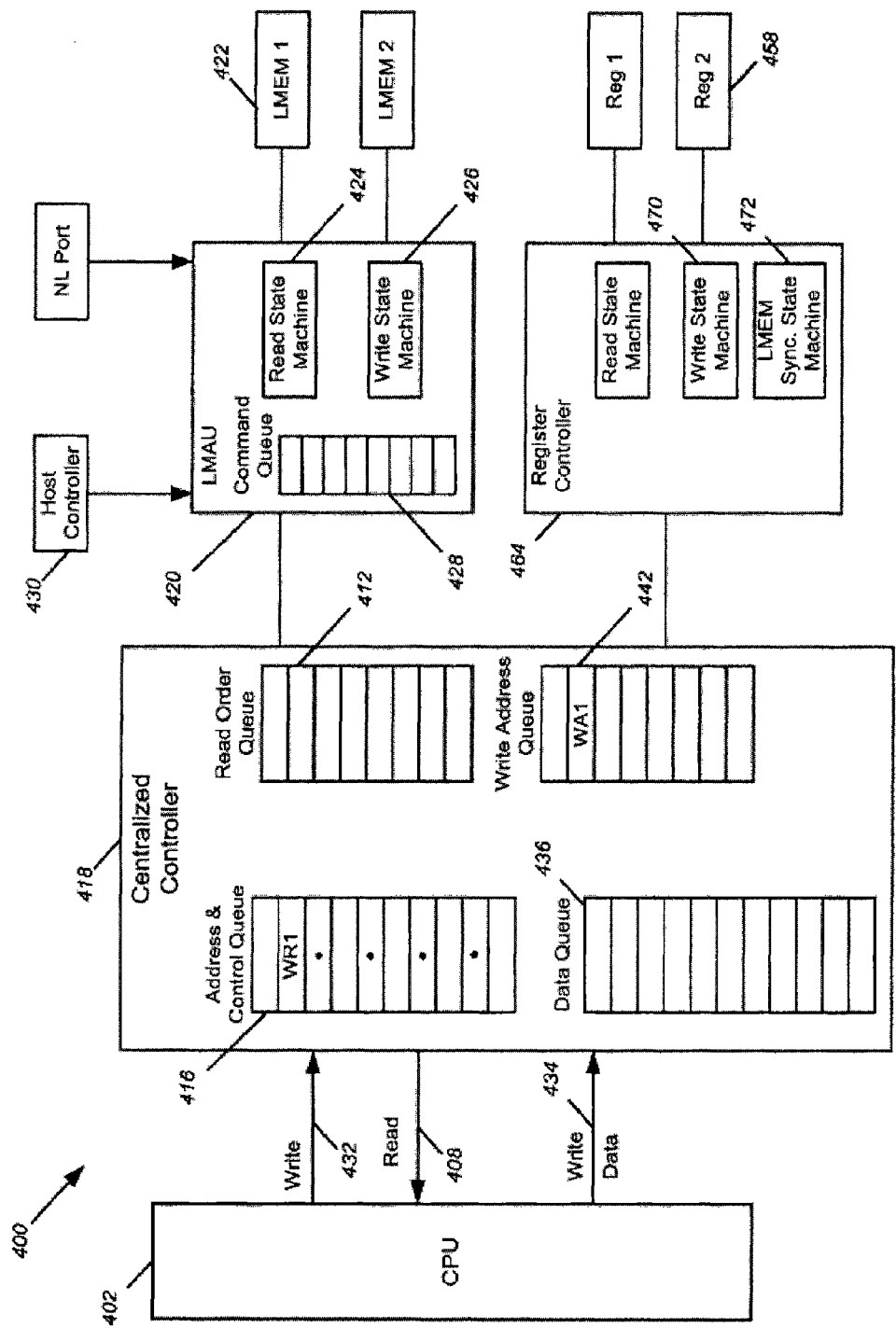
FIG. 4 illustrates an exemplary computing system according to aspects of the current invention utilizing resynchronization of data for devices with multiple requesters.

FIG. 4 illustrates an exemplary computing system 400 according to aspects of the current invention utilizing resynchronization of data for devices with multiple requesters. In some instances, a slave device may be accessed by multiple requesters, not all controlled by the CPU. Direct Memory Access (DMA) permits certain hardware subsystems of a computer system to access system memory for reading and writing independently of the CPU. DMA allows devices to transfer data without utilizing the CPU and adding to the system overhead. The transfer may be accomplished independently of the CPU by using a DMA controller, which controls the transfer of data. However, if the CPU, in addition to DMA, may be attempting to access the same address location, data coherency may become an issue. Therefore, in one embodiment of the invention, a bit may be set within the address instruction from the CPU to indicate that the present instruction may be completed before starting a request from another device.

Although embodiments of the invention may be described and illustrated herein in terms of a LMEM and associated LMAU controller interacting with various requesters, it should be understood that embodiments of this invention are not so limited, but are additionally applicable to other slave devices that may include one or more requester to ensure correct synchronization of commands, such as dual port SRAM.

As an example, the CPU 402 may be coupled to a Local Memory Application Unit (LMAU) 420 and finally to local memory (LMEM) 422. The LMAU 420 may be the controller associated with the attached LMEM 422. The LMAU may include a read state machine 424 and write state machine 426 to accomplish commands for reading and writing data to the LMEM 422. The LMAU 420 may be coupled to other host devices 430 that may access LMEM 422 directly, and independently of the CPU 402. If the CPU 402 sends a write request to LMEM 422, and another host device 430 subsequently sends a read request, the LMAU 420 should complete the CPU write instruction before the host read instruction is performed. A register 458 may be used to indicate that the associated LMEM 422 write by the CPU has been completed, to alert the host device 430 that the data may be retrieved for its read request.

The computer system 400 may include a CPU 402 with a write channel 432, read channel 408, and write data bus 434. The commands from the CPU 402 are received by the bridge centralized controller 418 and stored in an address and control queue 416, according to embodiments of the invention as described above. The centralized controller 418 sequences the commands and returned data by using a read order queue 412 and write address queue 442. The data associated with a write command may be stored in a data queue 436. The centralized controller 418 may be coupled to various slave device controllers, including LMAU 420 and register controller 464.

One bit of the address that may not be needed for the address location may be used to indicate to the LMAU 420 that the present instruction should be completed before later read requests for that same address location. The bit indicating the synchronization of LMAU commands may be the same bit used to notify the bridge to sequentially process information, as described above, or may be a different bit. The bit is part of the address of any memory access from the processor. The address bit synchronization indicator may be used in conjunction with a register write command to indicate that the associated LMEM write by the CPU has been completed, and to alert the host device that the data may be retrieved for its read command. The bridge controller interface then interprets the address bit indicator as a hold for any register operation associated with the address containing the bit from completing before all LMAU writes are completed.

If it is known that a write command to LMEM 422 from the CPU will be followed by a read command from a host device 430 outside of the CPU 402, the write command may indicate the need to synchronize these requests by turning on a bit within the address associated with the write request. A register write instruction may follow the LMEM write command from the CPU to indicate that the LMEM write instruction has completed. For example, a write command to LMEM 422, WL1, is sent from the CPU 402 over the write channel 432 and is stored in the address and control queue 416. The associated data is sent from the CPU 402 over the data bus 434 and stored in the data queue 436. The next command is a write register command, WR1, which is also stored in the address and control queue 418. The centralized controller 418 will pop the write command to LMEM 422, WL1, if a previous command is not currently using that address. The centralized controller 418 will then pop the next write command, WR1, from the address and control queue 416 since it is to a register with a different address from the LMEM, and if it is not being used by a different previous instruction.

The LMAU 420 receives the instruction and stores the command in a command queue 428. Since the LMAU 420 receives commands from various controllers, host controller 430 or CPU 402, the commands are stored in the command queue 428. The LMAU 420 also receives the read request for LMEM 422 from the host controller 430 using the data written by the CPU 402. The LMAU 420 includes a read state machine 424 and write state machine 426 to execute the commands from the command queue 428 and accomplish the read or write requests to the associated LMEM 422.

The register write command WR1 is sent to the register controller 464, and the write state machine 470 will initiate the writing to the associated register 458. However, an LMEM synchronizing state machine 472 may prevent the register write to be completed, or will not start the register write until the LMAU command queue 428 is empty, to ensure that the desired write, WL1, has been completed. The LMEM synchronizing state machine 472 monitors the LMAU 420 command queue 428 to determine if there are any remaining commands to complete. Once the command queue 428 is empty, the LMEM synchronizing state machine 472 will know that the desired LMEM 422 write instruction, WL1, has completed. The LMEM synchronizing state machine 472 then permits the register write instruction, WR1, to complete. The completion of the register write indicates that the host controller 430 may read the desired memory address, and ensures that the commands are properly synchronized to ensure data coherency between various host and master devices.

Note that one or more of the functions described above can be performed by firmware stored in memory. Referring back to FIG. 3, the memory 380 may be within the bridge and executed by a local processor 382 within the controller 318, or may be stored in program storage 352 and executed by host processor 302, or may even be stored in a peripheral memory 354. The firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. An apparatus for maintaining data coherency when transferring data between a master device and one or more target devices, comprising:
    an address and control queue configured for storing instructions received from the master device;
    an ordering queue configured for storing addresses of in-process instructions and controlling a sequencing of the in-process instructions; and
    control logic coupled to the address and control queue and the ordering queue, the control logic configured for storing an address of a next instruction in the address and control queue into the ordering queue when the target device associated with the next instruction is available, the stored address of the next instruction indicating the target device associated with the next instruction, the next instruction instructing data transfer between the master device and the target device associated with the next instruction.

2. The apparatus of claim 1, the control logic further configured for using the ordering queue to determine if the target device associated with the next instruction in the address and control queue is available.

3. The apparatus of claim 1, further comprising a used address register coupled to the control logic, the control logic further configured for using the used address register to determine if the target device associated with the next instruction in the address and control queue is available.

4. The apparatus of claim 1, further comprising a depth register coupled to the control logic, the control logic further configured for using the depth register to determine how many instructions can be stored in the address and control queue.

5. The apparatus of claim 4, wherein the depth register is programmable in firmware.

6. The apparatus of claim 1, the control logic further configured for reading a sequential processing bit in the instructions stored in the address and control queue, and executing the next instruction stored in the address and control queue in a sequential manner if the sequential processing bit of the next instruction is asserted.

7. The apparatus of claim 1, wherein the ordering queue is a read order queue configured for storing the addresses of in-process read instructions and controlling read data being returned to the master device.

8. The apparatus of claim 7, further comprising a memory read state machine coupled to the control logic and configured for communicating with the one or more target devices to retrieve data when a read instruction has been popped from the address and control queue.

9. The apparatus of claim 7, further comprising select logic coupled to the read order queue and configured for controlling data being returned from the one or more target devices in accordance with the addresses stored in the read order queue.

10. The apparatus of claim 1, wherein the ordering queue is a write address queue configured for storing the addresses of in-process write instructions and controlling write data being sent to the one or more target devices.

11. The apparatus of claim 10, further comprising a memory write state machine coupled to the control logic and configured for communicating with the one or more target devices to write data to the one or more target devices when a write instruction has been popped from the address and control queue.

12. The apparatus of claim 11, further comprising a write data queue coupled to the memory write state machine and configured for storing write data to be written to the one or more target devices.

13. The apparatus of claim 1, the apparatus incorporated within a bridge circuit.

14. The apparatus of claim 13, the bridge circuit incorporated within an application specific integrated circuit (ASIC).

15. The apparatus of claim 14, the ASIC incorporated within a host bus adapter (HBA).

16. The apparatus of claim 15, the HBA incorporated within a storage area network.

17. A method for maintaining data coherency when transferring data between a master device and one or more target devices, comprising:
    storing instructions received from the master device in an address and control queue;
    storing an address of a next instruction in the address and control queue into an ordering queue when the target device associated with the next instruction is available, the stored address of the next instruction indicating the target device associated with the next instruction, the next instruction instructing data transfer between the master device and the target device associated with the next instruction; and
    controlling a sequencing of in-process instructions using the ordering queue.

18. The method of claim 17, further comprising using the ordering queue to determine if the target device associated with the next instruction in the address and control queue is available.

19. The method of claim 17, further comprising using a used address register to determine if the target device associated with the next instruction in the address and control queue is available.

20. The method of claim 17, further comprising using a depth register to determine how many instructions can be stored in the address and control queue.

21. The method of claim 20, wherein the depth register is programmable in firmware.

22. The method of claim 17, further comprising reading a sequential processing bit in the instructions stored in the address and control queue, and executing the next instruction stored in the address and control queue in a sequential manner if the sequential processing bit of the next instruction is asserted.

23. The method of claim 17, further comprising storing the addresses of in-process read instructions and controlling read data being returned to the master device using a read order queue.

24. The method of claim 23, further comprising communicating with the one or more target devices to retrieve data when a read instruction has been popped from the address and control queue.

25. The method of claim 23, further comprising controlling data being returned from the one or more target devices in accordance with the addresses stored in the read order queue.

26. The method of claim 17, further comprising storing the addresses of in-process write instructions and controlling write data being sent to the one or more target devices using a write address queue.

27. The method of claim 26, further comprising communicating with the one or more target devices to write data to the one or more target devices when a write instruction has been popped from the address and control queue.

28. The method of claim 27, further comprising storing write data to be written to the one or more target devices in a write data queue.

* * * * *